Nov. 21, 1950     L. H. FLORA     2,531,264
FASTENING DEVICE
Filed June 22, 1945
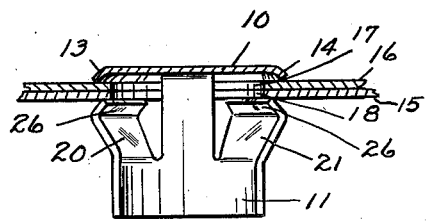
FIG. 1
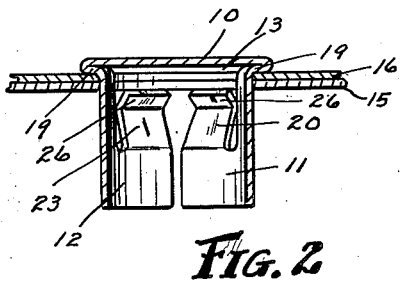
FIG. 2
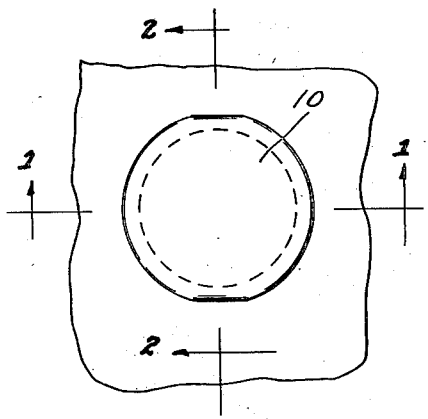
FIG. 3
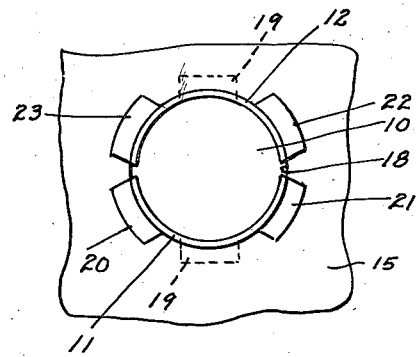
FIG. 4
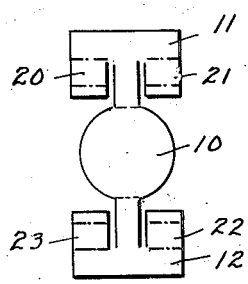
FIG. 6
FIG. 5
INVENTOR.
LAWRENCE H. FLORA
BY Bates, Teare, & McLean
ATTORNEYS Patented Nov. 21, 1950

2,531,264

UNITED STATES PATENT OFFICE 2,531,264

FASTENING DEVICE

Lawrence H. Flora, Cleveland, Ohio, assignor to Tinnerman Products, Inc., Cleveland, Ohio, a corporation of Ohio Application June 22, 1945, Serial No. 600,998

4 Claims. (Cl. 24—213)

This invention relates to fastening devices and particularly to those that are constructed of sheet metal. The device has particular application in holding together two panels or plates of sheet material by insertion thereof through registering openings in the panels.

Panels of sheet material have usually been connected together by a permanent rivet which extends through registering openings in the panel, but usually such rivets are not detachable. There are many instances, however, where it is desirable that the fastening devices be removable, and an effort has been made to provide such devices, but they have usually taken the form of hollow tubular snap fastening clips which are open at both ends and which are, therefore, subject to the objection of an open passageway through which dust and foreign matter may pass through the panels. Moreover, the projecting ends of the fastening device, particularly those on the exposed surface of the panel present an objectionable appearance and preclude use of the devices on a panel where a relatively smooth appearance is desired.

An object of the present invention, therefore, is to provide a fastening device which may be conveniently made of sheet metal which is adapted to be inserted through registering openings in two or more panels and to hold them together by a snap fastening action, and which when so assembled will substantially seal the openings and present a head that is nearly flush with the surface of the enclosed panel. In addition, the invention contemplates a construction wherein the fastener may be economically manufactured and which may be quickly applied in assemblies on a production basis.

Referring now to the drawings, Figs. 1 and 2 are sections taken on planes indicated by the lines 1—1 and 2—2 in Fig. 3; Fig. 3 is a top plan view of the fastener applied to a plurality of panels; Fig. 4 is a bottom plan view of the assembly shown in Fig. 3; Fig. 5 is a section similar to Fig. 1, but showing the fastener in the act of being pushed into the registering opening in the panel, and Fig. 6 represents a blank from which the fastener of the present invention may be made.

The fastening device of the present invention is made from a sheet metal strip that is shaped to provide a disc-like head 10, and a shank that is integral therewith and is generally of tubular formation. The axis of the shank is substantially coincident with the axis of the disc. The shank preferably comprises two opposing legs which are curved transversely so that each forms substantially a semi-cylindrical portion 11 and 12 which cooperate to make the generally tubular formation of the shank. As shown in Fig. 2, the legs are indented from the edges of the head to provide flange portions 19 which operate as shoulders for engaging the outer face of a panel 16. A coacting panel is indicated at 15, and the panels have registering openings 17 and 18 therein through which the shank members are adapted to extend. As shown in Figs. 1 and 5, the marginal portions of the head 10 intermediate the points of connection with the legs 11 and 12 are bent downwardly, as indicated at 13 and 14, to cooperate with the flanges 19 and provide a uniform bearing surface against the panel 16 and to maintain the outer portion of the head 10 nearly flush with the surface of the panel 15.

To effect a snap-fastening engagement between the fastening device and the panels, the legs 11, 12 normally are slightly larger than the diameter of the opening in the panels, and inasmuch as the legs have spring-like characteristics, they tend to expand outwardly against the walls of the apertures in the panels whenever they are forced therethrough. A more positive locking action is effected by means of yieldable fingers or tongues that present shoulders for engagement with the inner panel 15. In the preferred arrangement the leg 11 has two such fingers 20 and 21 thereon, while the leg 12 has fingers 22 and 23 thereon. Each finger 20 to 23, inclusive, preferably extends outwardly and then inwardly to present an inclined shoulder 26 which makes the device suitable for use on panels of different thickness, and allows for variations in the thickness of panels with which the fasteners are designed for use.

The fingers also have spring-like characteristics and are yieldable to admit the shank readily through the panel openings, whenever the device is pushed axially therethrough. Fig. 5, for example, shows the position of the fingers on the legs during the assembly operation.

In Fig. 6, I have shown a blank from which the device of the present invention may be formed, and I have indicated thereon the parts which form the head 10, the legs 11 and 12 and the fingers 20 to 23, inclusive, from which it will be seen that the device can readily be made from strip stock and that there is comparatively little waste in the manufacture thereof.

An important advantage of a fastener made in accordance with the present invention is the fact that it may be locked automatically into snap-fastening engagement whenever the shank is inserted into the panel openings, and that when assembled, the device conceals the openings and forms a substantially smooth surface on the exposed portion of the outer panel. A further advantage of the present device is the fact that it is detachable from the panels and that it can be used repeatedly, thus operating in a satisfactory manner to produce a temporary, as well as a permanent, fastener whenever desired.

I claim:

1. A fastening device of resilient sheet material comprising a central portion adapted to form a closing head, a plurality of legs extending from the periphery of the said closing portion and bent first inwardly along the underside of the closing portion and thence at an angle thereto, each leg having a comparatively narrow portion intermediate its extremity and the head and a portion enlarged in each direction at its extremity, tongues provided by severing to a depth greater than their width the upper part of the enlarged portions on the legs, said tongues freely projecting first outwardly from such portions and then inwardly in a direction inclining toward the head.

2. A fastening device comprising a central disc-like head, a pair of legs joining diametrically opposite edges of the head and diverted inwardly by return bends to lie beneath the head, said legs then continuing in substantially parallel relationship at an angle to the head, and being widened and curved at their extremities into substantially semi-cylindrical formation thereby having a comparatively narrow portion intermediate their extremities and the head, outwardly projecting resilient lugs extending from the top of said widened portions at each side of said intermediate narrow portion and adapted to be inserted through the opening in the support and thereafter spring outwardly beneath the support.

3. A fastening device made of a single strip of resilient sheet material comprising a central disc-like head, a pair of comparatively narrow legs joining the diametrically opposite sections of the head and diverted inwardly by return bends to lie beneath the head, said legs then continuing substantially in parallel relationship at an angle to the head and having enlarged portions at their extremities curved to substantially semi-cylindrical formation in a region spaced from the head, the upper ends of said enlarged semi-cylindrical formation being partially severed and bent outwardly and then inwardly in a direction inclining toward the head to provide retaining lugs adapted to be inserted through the opening in the support and thereafter spring outwardly beneath the support.

4. A fastening device comprising a strip of sheet metal bent intermediately to provide a head and two legs depending therefrom, the legs extending first inwardly and then at an angle to said head, said legs then being curved transversely to provide a shank of generally tubular formation adapted for insertion through registering openings in two parts to be joined, the head having an area greater than the opening and adapted to conceal the same when the shank is inserted therethrough, each leg of the shank having a comparatively narrow portion intermediate its extremity and the head and an enlarged portion at its extremity, a pair of resilient fingers formed integrally from each enlarged portion and freely extending outwardly and then inwardly in a direction inclining toward the head from each side of said intermediate portion to provide spaced shoulders adapted to engage the edge of the opening in the adjacent part being joined and which coact with the head to clamp said parts together.

LAWRENCE H. FLORA.

REFERENCES CITED

The following references are of record in the file of this patent:

UNITED STATES PATENTS

| Number | Name | Date |
| --- | --- | --- |
| 1,400,155 | Greenburg | Dec. 13, 1921 |
| 1,601,844 | Blackmore | Oct. 5, 1926 |
| 1,731,206 | Walters | Oct. 8, 1929 |
| 1,859,779 | Lee | May 24, 1932 |
| 1,887,611 | Wittenberg | Nov. 15, 1932 |
| 2,041,336 | Hull | May 19, 1936 |
| 2,391,298 | Davis | Dec. 18, 1945 |

FOREIGN PATENTS

| Number | Country | Date |
| --- | --- | --- |
| 521,276 | Great Britain | May 16, 1940 |